US008244922B2

United States Patent
Tatapudi et al.

(10) Patent No.: US 8,244,922 B2
(45) Date of Patent: *Aug. 14, 2012

(54) METHOD AND APPARATUS FOR DYNAMICALLY CONFIGURING HARDWARE RESOURCES BY A GENERIC CPU MANAGEMENT INTERFACE

(75) Inventors: Vamsi M. Tatapudi, Santa Clara, CA (US); Anirban Banerjee, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 12/578,150

(22) Filed: Oct. 13, 2009

(65) Prior Publication Data

US 2010/0030879 A1 Feb. 4, 2010

Related U.S. Application Data

(63) Continuation of application No. 11/324,222, filed on Jan. 4, 2006, now Pat. No. 7,606,945.

(51) Int. Cl.
*G06F 3/00* (2006.01)
*G06F 13/00* (2006.01)

(52) U.S. Cl. ............. 710/8; 710/1; 710/2; 710/3; 710/9; 710/10; 710/105; 710/110; 710/301; 370/386; 370/438

(58) Field of Classification Search .................. 710/110, 710/301, 1–3, 8–10, 105; 370/386, 438
See application file for complete search history.

(56) References Cited

U.S. PATENT DOCUMENTS

| | | | |
|---|---|---|---|
| 5,048,012 A | 9/1991 | Gulick et al. | |
| 5,245,703 A | 9/1993 | Hubert | |
| 5,625,780 A * | 4/1997 | Hsieh et al. | 710/316 |
| 6,119,159 A | 9/2000 | Tseng et al. | |
| 6,275,491 B1 | 8/2001 | Prasad et al. | |
| 6,807,179 B1 | 10/2004 | Kanuri et al. | |
| 6,836,479 B1 | 12/2004 | Sakamoto | |
| 6,850,542 B2 | 2/2005 | Tzeng | |
| 7,180,906 B1 | 2/2007 | Dwork | |
| 7,181,556 B2 | 2/2007 | Gwilt | |
| 7,181,608 B2 | 2/2007 | Fallon et al. | |
| 7,254,112 B2 * | 8/2007 | Cornet et al. | 370/230 |
| 7,606,945 B2 | 10/2009 | Tatapudi et al. | |
| 7,782,891 B2 * | 8/2010 | Kadambi et al. | 370/438 |
| 2002/0069354 A1 | 6/2002 | Fallon et al. | |
| 2002/0085585 A1 | 7/2002 | Tzeng | |
| 2002/0156888 A1 | 10/2002 | Lee et al. | |

(Continued)

OTHER PUBLICATIONS

"American National Standard for Information Technology", Fibre: Channel Arbitrated Loop (FC-AL-2, (Aug. 26, 1999), p. 73-85.

(Continued)

*Primary Examiner* — Tammata Peyton

(57) ABSTRACT

A programmable network component for use in a plurality of network devices with a shared architecture, where the programmable network component includes an interface with an external processing unit to provide management interface control between the external processing unit and a network device. The programmable network component also includes a plurality of internal busses each of which is coupled to the programmable network component and to at least one network component. The programmable network component further includes a plurality of external buses each of which is coupled to the programmable network component and to at least one physical interface. The programmable network component is configured to support a plurality of protocols for communication with a plurality of physical interface components and comprises a plurality of programmable registers for determining the status of the plurality of physical interfaces.

20 Claims, 4 Drawing Sheets

U.S. PATENT DOCUMENTS

2002/0174197 A1 11/2002 Schimke et al.
2005/0204157 A1 9/2005 Johnson
2008/0155155 A1* 6/2008 Christensen et al. ......... 710/301

OTHER PUBLICATIONS

Intel Corporation, "Intel® IXP2855 Network Processor", 2005, Intel Corporation, http://download.intel.com/design/network/ProdBrf/30943001.pdf, p. 1-8.

LAN/MAN Standards Committee, "802.3ae", The Institute of Electrical and Electronics Engineers, Inc., http://ieeexplore.ieee.org/iel5/8064/22299/01 040118.pdf?tp=&isnumber=22299&arnumber=1 040118, (Aug. 30, 2002), p. 161-164.

European Search Report for European Patent Application No. 06020737.0/2416, mailed on May 8, 2007.

* cited by examiner

METHOD AND APPARATUS FOR DYNAMICALLY CONFIGURING HARDWARE RESOURCES BY A GENERIC CPU MANAGEMENT INTERFACE

CROSS-REFERENCE TO RELATED APPLICATIONS

This application is a continuation of U.S. patent application Ser. No. 11/324,222, filed on Jan. 4, 2006, now U.S. Pat. No. 7,606,945, which is hereby incorporated by reference in its entirety.

BACKGROUND OF THE INVENTION

1. Field of the Invention

The present invention relates to an apparatus and method of accessing a central processing unit (CPU) with a generic CPU processing unit, and more particularly, to a method for programmably configuring the CPU processing unit so that it may be used on a plurality of switching devices.

2. Description of the Related Art

A switching system may include one or more network devices, such as a switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

As packets enter the device from multiple ports, they are forwarded to the ingress module where switching is performed on the packets. Thereafter, the packets are transmitted to the MMU for further processing. Thereafter, the egress module transmits the packets to at least one destination port, possibly including a CPU port. If information is being transmitted to the CPU port, the egress module forwards the information through a CPU processing unit, such as a Central Processing Unit Management Interface Controller (CMIC™) module, which takes care of all CPU management functions. For example, the CMIC™ module takes care of sending and receiving packets to and from the CPU port, changing the register memory settings and interfacing with internal and/or external busses.

Even in a family of switching chips that share the same architecture, the number of ports and the speed supported by the ports, among other features, may vary. As such, each switching chip in a shared architecture family has a CMIC™ design that is customized for that switching chip depending on, for example, the number and speed of ports associated with the switching chip. Such customization in the CMIC™ module is expensive, time consuming and error-proned. Therefore, there is a need for a generic CMIC™ module that may be used in various switching chips that share a common architecture.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
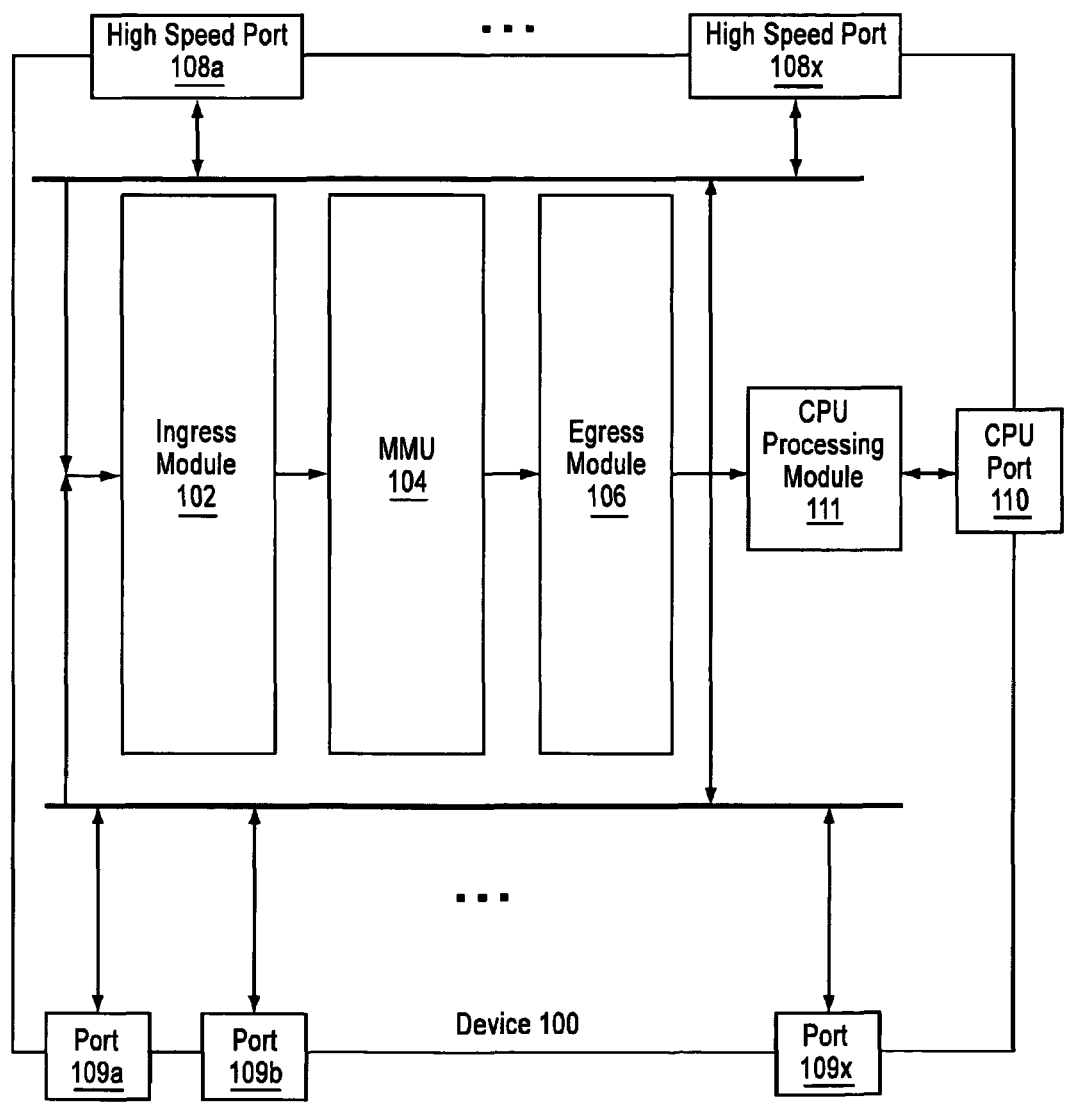
FIG. 1 illustrates a network device in which an embodiment of the present invention may be implemented.

FIG. 1 illustrates a network device, such as a switching chip, in which an embodiment the present invention may be implemented. Device 100 implements a pipelined approach to process incoming packets and includes an ingress pipeline/module 102, a MMU 104, and an egress pipeline/module 106. Ingress module 102 is used for performing switching functionality on an incoming packet. MMU 104 is used for storing packets and performing resource checks on each packet. Egress module 106 is used for performing packet modification and transmitting the packet to an appropriate destination port. Each of ingress module 102, MMU 104 and egress module 106 includes multiple cycles for processing instructions generated by that module.

Device 100 may also include one or more internal fabric/high gigabit (HiGIG™) ports 108a-108x, one or more external Ethernet ports 109a-109x, and a CPU port 110. Internal fabric ports 108a-108x are used to interconnect various devices in a system and thus form an internal fabric for transporting packets between external source ports and one or more external destination ports. As such, internal fabric ports 108a-108x are not externally visible outside of a system that includes multiple interconnected devices. In one embodiment of the invention, each of ports 108 is an XPORT that can be configured to operate in 10 Gbps high speed mode, 12 Gbps high speed mode, or 10 GE mode. Each of the one or more external Ethernet ports 109a-109x is a 10/100/1000 Mbps Ethernet GPORT. One embodiment of device 100 supports up to twelve 10/100/1000 Mbps Ethernet ports per GPORT module. One embodiment of device 100 also supports one high speed port 108; while another embodiment of the invention supports up to four high speed ports 108 which operates in either 10 Gbps, 12 Gbps 10 GE speed mode.

CPU port 110 is used to send and receive information to and from external switching/routing control entities or CPUs. According to an embodiment of the invention, CPU port 110 may be considered as one of external Ethernet ports 109a-109x. Device 100 interfaces with external/off-chip CPUs through a CPU processing module 111, such as a CMIC™ module, which interfaces with a PCI bus that connects device 100 to an external CPU. In the present invention, CMIC™ module 111 is a software programmable module, wherein the software may program various CMIC registers in order for CMIC™ module 111 to properly perform CPU management on each of a plurality of switching chips 100 that share a common architecture.

Network traffic enters and exits device 100 through external Ethernet ports 109a-109x. Specifically, traffic in device 100 is routed from an external Ethernet source port to one or more unique destination Ethernet ports 109a-109x. In one embodiment of the invention, device 100 supports physical Ethernet ports and logical (trunk) ports. A physical Ethernet port is a physical port on device 100 that is globally identified by a global port identifier. In an embodiment, the global port identifier includes a module identifier and a local port number that uniquely identifies device 100 and a specific physical port. The trunk ports are a set of physical external Ethernet ports that act as a single link layer port. Each trunk port is assigned a global a trunk group identifier (TGID). Destination ports 109a-109x on device 100 may be physical external Ethernet ports or trunk ports. If a destination port is a trunk port, device 100 dynamically selects a physical external Ethernet port in the trunk by using a hash to select a member port. The dynamic selection enables device 100 to allow for dynamic load sharing between ports in a trunk.

Figure 2:
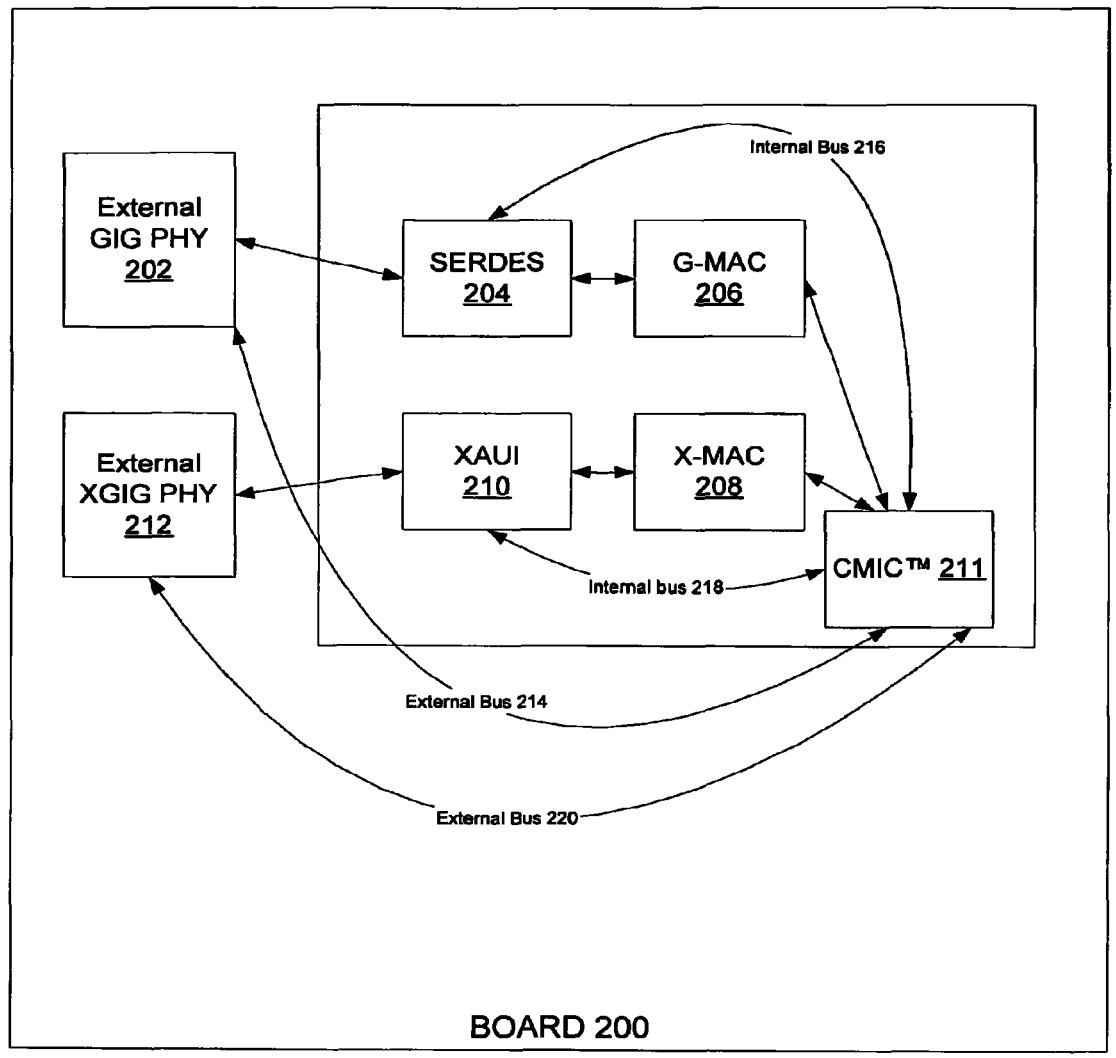
FIG. 2 illustrates a board on which an embodiment of the network device may reside.

As is known to those skilled in the art, a board on which a chip resides, as illustrated in FIG. 2, includes at least one external layer 1 physical interface (PHY), wherein one PHY 202 may be used for GIG ports and another PHY 212 may be used for XGIG ports. If the information is transmitted in copper mode, the information is transmitted through PHY 202 and 212, depending on the port and thereafter, the information is sent from PHY 202/212 to the appropriate MAC 206/208. The information is then processed by the ingress module 102, the MMU 104 and the egress module 106 and the processed information is transmitted to the appropriate PHY 202/212 through the appropriate MAC 206/208.

If information is transmitted to the chip through a fiber wire, the chip may include a serialization/deserialization (SERDES) module 204 for GIG ports and a 10 Gigabit Attachment Unit Interface (XAUI) module 210 for XGIG ports, as shown in FIG. 2. Each of the SERDES module 204 and XAUI module 210 converts information entering the chip from PHYs 202/212 into bytes before it is transmitted to Media Access Controls (MACs) 206/208. It should be apparent to one skilled in the art that Media Access Control (MAC) 206 is equivalent to GPORT 109 and MAC 208 is equivalent to XPORT 108. The SERDES module 204 also performs analog and digital checks on the information before it transmits the information to MAC 206.

In an embodiment of the invention, packet data enter device 100 through 6 integrated 1G quad SERDES core 204 or XAUI 210, each of which provides serialization/de-serialization function. Depending on how the packet enters the chip, the packet data is either converted to the standard Gigabit Media Independent Interface (GMII) interface signaling output of quad SERDES 204 before transmission to the GPORT/MAC (G-MAC) 206 or from XAUI interface signaling to 10 Gigabit Medium Independent Interface (XGMII) interface before transmission to the XPORT/MAC (X-MAC) 208. In an embodiment, there are 2 instantiated GPORT modules that account for up to 24 Gbps of packet stream entering chip 100. Each GPORT module is connected to 3 quad serialization/deserialization (SERDES) ports as each GPORT integrates 12-Gigabit Ethernet ports that can be individually configured to run at 3 different speeds 10/100/1000 Mbps.

Each GPORT also interfaces with a centralized bus graphics port ingress packet buffer (GBOD), i.e., a centralized GPORT ingress packet buffer that holds the packet data, for all 12 Gigabit Ethernet ports in the GPORT, before it enters ingress pipeline 102 for packet switching. Similarly, X-MAC 208 also interfaces, via a 128-bit wide bus running at a core clock frequency, with a centralized extendable port ingress packet (XBOD) buffer, i.e., a centralized XPORT ingress packet buffer that holds the packet data before it enters ingress pipeline 102 for packet switching. The packet data is packed to 128 byte in the XBOD/GBOD since 128 byte is the granularity that ingress pipeline 102 uses to process the packet. Once 128 bytes of packet data or an end of packet (EOP) cell is received, the XBOD/GBOD interface with ingress pipeline 102 waits to receive a time division multiplex (TDM) grant from ingress pipeline 102, and upon receiving the grant, transmits the packet data via a 256-bit wide bus. Every 6 cycles there is an ingress pipeline arbiter TDM time slot assigned to each XPORT/GPORT for its packet data transfer. In an embodiment, ingress pipeline 102 implements a TDM scheme to arbitrate its resources between 4 XPORTs and 2 GPORTs. Since the GBOD buffers the packet data for all 12 GE ports, the GBOD also implements a 6 cycle TDM scheme to locally arbitrate the GPORT-to-ingress pipeline bus among the 12 GE ports.

The CPU needs information from each of PHYs 202 and 212, SERDES 204 and XAUI 210. As such, CMIC™ module 211 supports an external Management Data Input/Output (MDIO) bus 214 for communicating with external PHY 202, an internal MDIO bus 216 for communicating with SERDES module 204, an internal MDIO bus 218 for communicating with XAUI module 210, and an external MDIO bus 220 for communicating with external XGIG PHY 212. To communicate with XAUI module 210 and external XGIG PHY 212, CMIC™ module 211 also supports MDIO protocol clause-22 for GIG ports and/or XAUI and supports MDIO protocol clause-45 for XAUI. As is known to those skilled in the art, each chip may have a different number, up to 32, of PHYs on each of busses 214 and 220.

To determine if a PHY is operational, the CPU instructs the CMIC™ module 211 to perform an auto scan operation to link scan the status of each PHY 202/212. In the current invention, CMIC™ module 211 is configured to include a port bitmap for the link status that needs to be scanned. When CMIC™ module 211 performs a hardware link scan, CMIC™ module 211 sends MDIO transactions on the appropriate internal or external bus 214-220 to obtain the status information. Specifically, software programs associated with CMIC™ module 211 configure registers in CMIC™ module with the port bitmap for which link status needs to be scanned, wherein a port type map register is configured to indicate if a port is a GIG port or a XGIG port and a select map register is configured to indicate if an internal or external MDIO bus is to be scanned. Based on the information obtained from the port type map register and the select map register, CMIC™ module 211 is able to select an appropriate bus on which to send each transaction. Associated software in CMIC™ module 211 also programs a protocol map register in CMIC™ module 211 to indicate if clause 22 or clause 45 is to be used for Media Independent Interface Management (MIIM) transactions. The protocol map register specifies a port bitmap similar to the port type map register. Furthermore, associated software may configure multiple address map registers in the CMIC™ module 211 with the PHY number for each port to which information should be addressed. Together, the address map registers may be used to determine the PHY address to be used for each port. Such flexible support allows users of device 100 to randomly map PHY identifiers to port numbers instead of requiring the chip user to implement a one-to-one mapping between a PHY identifier and a port number.

Once a packet is processed by device 100, on the egress side, egress pipeline 106 interfaces with a XBODE, i.e., an egress packet buffer that holds the packet data before it is transmitted to XAUI 210/PHY 212, or a GBODE, i.e., an egress packet buffer that holds the packet data before it is transmitted to SERDES 204/PHY 202. The XBODE is associated with X-MAC 208 and the bus protocol between X-MAC 208 and egress pipeline 106 is credit based so that whenever there is a cell available in XBODE, the egress pipeline interface in X-MAC 208 makes a request to egress pipeline 106 for more data. Similar to the GBOD, GBODE is a buffer for all 12 GE ports so that a local TDM is implemented to guarantee the minimum bandwidth allocated to transfer data from the GBODE to SERDES 204/PHY 202. The bus protocol between G-MAC 206 and egress pipeline 106 is also credit based. Egress pipeline 106 also implements a TDM scheme to arbitrate its resources between 4 XPORT and 2 GPORT for egress data. Thus, if there is packet data to be transmitted, the latency between XPORT cell request and data return for the egress pipeline is about 6 cycles.

Returning to FIG. 1, CMIC™ module 111 serves as a CPU gateway into device 100, wherein CMIC™ module 111 provides CPU management interface control to device 100 by allowing register/memory read/write operations, packet transmission and reception and other features that off loads predefined maintenance functions from the CPU. CMIC™ module 111 may serve as a PCI slave or master and may be configured to map to any PCI memory address in the CPU on a 64K boundary. In an embodiment of the invention, all registers in CMIC™ module 111 are 32 bits. As a PCI slave, CMIC™ module 111 allows PCI read/write burst accesses to predefined CMIC™ registers. CMIC™ module 111 and the CPU also work together in a master-slave relationship. The CPU gives a command to CMIC™ module 111 by programming the CMIC™ registers appropriately; typically by setting a "START" bit and waiting for a "DONE" bit.

In one embodiment of the invention, in order to leverage the same CMIC™ module 111 hardware design across a number of switching devices that includes the same architecture, CMIC™ module 111 includes extra programmable hardware so that the software associated with CMIC™ module 111 can configure the appropriate registers in the CMIC™ module. The programmed registers may be used by CMIC™ module 111 to determine the type of switching device. In an embodiment of the invention, software associated with CMIC™ module 111 reads the device identifier from a chip to determine which types of CMIC register settings are required from that chip. Thereafter, the software programs the appropriate CMIC registers. As such, the present invention does not require hardware changes to CMIC™ module 111 in order to accommodate each switching chip in a group of switching chips with a shared architecture. Moreover, since the register interface is the same for all chips in the group of chips with a shared architecture, the same software structure may be shared by all chips in the group.

Figure 3A:
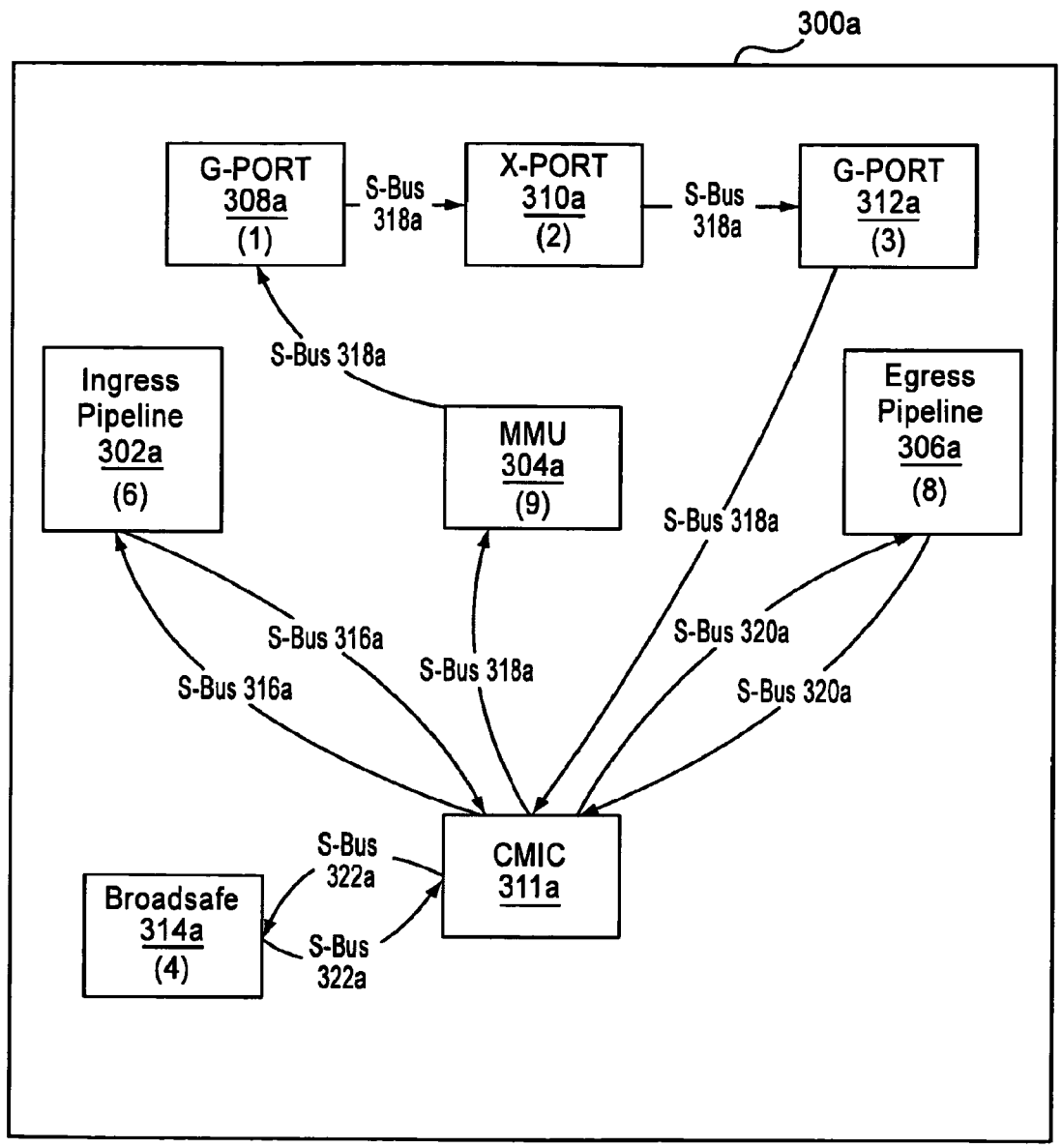
FIGS. 3a and 3b illustrate embodiments of the inventive CMIC™ module.

Specifically, as shown in FIG. 3*a*, CMIC™ module 111 supports up to four s-busses, wherein each chip is configured to use one or more of these s-busses. Each bus may have at least one device. Although there is no limit on the maximum number of devices that may be placed on each bus, due to latency concerns, the number of devices may be limited. As is apparent to one skilled in the art, the number of s-busses may be increased without changing the scope of the present invention.

In one embodiment of the invention, as mentioned above, CMIC™ module 311 is able to collect statistics counts from multiple sources, for example, ingress module 302*a*, egress module 306*a*, and MACs 308*a*-312*a*. As illustrated in FIG. 1, highly integrated switching chips support a reasonably large number of ports, each of which has its own statistics counters that are typically implemented in 50-100 registers. Specifically, each of the G-ports and X-ports 308-312 includes layer 1/layer 2 statistics counters for recording information associated with packets flowing through the port. Each of these counters tracks various aspects of the switch including the number of bytes received, the number of packets transmitted and the number of packets received and dropped. The CPU monitors these counters and, when the number of total registers becomes large; the CPU becomes loaded with hundreds of register reads and accrues overhead waiting for the individual register reads to complete. Thus, CMIC™ module 111 supports a statistic counter direct memory access (DMA) feature to reduce the CPU overhead. CMIC™ module 111 also supports table DMA to DMA any switch table to a PCI system memory.

CMIC™ module 111 also connects to the ingress pipeline 102 and the egress pipeline 106 so that CMIC™ module 111 can transfer cell data from the PCI memory to any egress port and/or receive cell data from any ingress port and transfer the data to the PCI memory. Each of ingress module 302 and egress module 306 includes layer 2/layer 3 and/or higher layer statistics counters for recording information about packets processed in the ingress and egress modules. In an embodiment of the invention, there are thirty statistics registers in the ingress module, fifteen statistics registers in the egress module, up to one seventy MAC registers, depending on whether the MAC is a XPORT or a GPORT. As is apparent to one skilled in the art, the number of statistics MAC registers and registers in each of the ingress module and egress module may be extended based on the requirements of the switching device. To properly process the packets, the CPU need to received information from each of the statistics registers on a periodic basis. For example, the CPU may use the information from the statistics registers for customer diagnostics and/or to take corrective action in the chip. All of the statistics registers are accessible to s-busses 316*a*-322*a* so that individual messages can be sent to various modules. However, depending of the number of registers on the chip and the frequency of changes to each register, the CPU and CMIC™ module 311 may spend a significant amount of time reading all of registers to obtain the necessary information for the CPU. Hence, CMIC module 111 supports a Statistics DMA controller capable of transferring chunks of Stats data without CPU intervention According to an embodiment, a portion of CPU memory is set up for Statistics data Direct Memory Access (DMA), with a timer mechanism. When the programmable timer in the CMIC module 311 expires, it launches a series of S-bus transactions to collect the statistics registers specified. The CMIC module 311 then transfers the statistics data to the CPU memory location specified. This process is repeated every time the programmable timer interval elapses. This implementation is also sensitive to the number of ports in the chip.

As shown in FIG. 3*a*, switching chip 300*a* includes an ingress pipeline module 302*a* that is assigned a block identifier 6, a MMU module 304*a* that is assigned a block ID of 9, an egress pipeline module 306*a* that is assigned a block ID of 8, GPORT and XPORT 308*a*-312*a*, a broad safe module 314*a* which serves as an encryption engine and a CMIC™ module 311*a* for managing an external CPU. Switching chip 300*a* also includes four s-bus rings 316*a*-322*a*, wherein CMIC™ module 311*a* uses s-bus ring 316*a* to send information to and receive information from ingress module 302*a*, s-bus ring 318*a* to send information to and receive information from MMU module 304*a* and GPORT and XPORT 308*a*-312*a*, s-bus ring 320*a* to send information to and receive information from egress module 306*a*, and s-bus ring 322*a* to send information to and receive information from broad safe module 314*a*. Each of the s-bus interfaces in the present invention is a 32-bit transmit and 32-bit receive point-to-point bus.

Figure 3B:
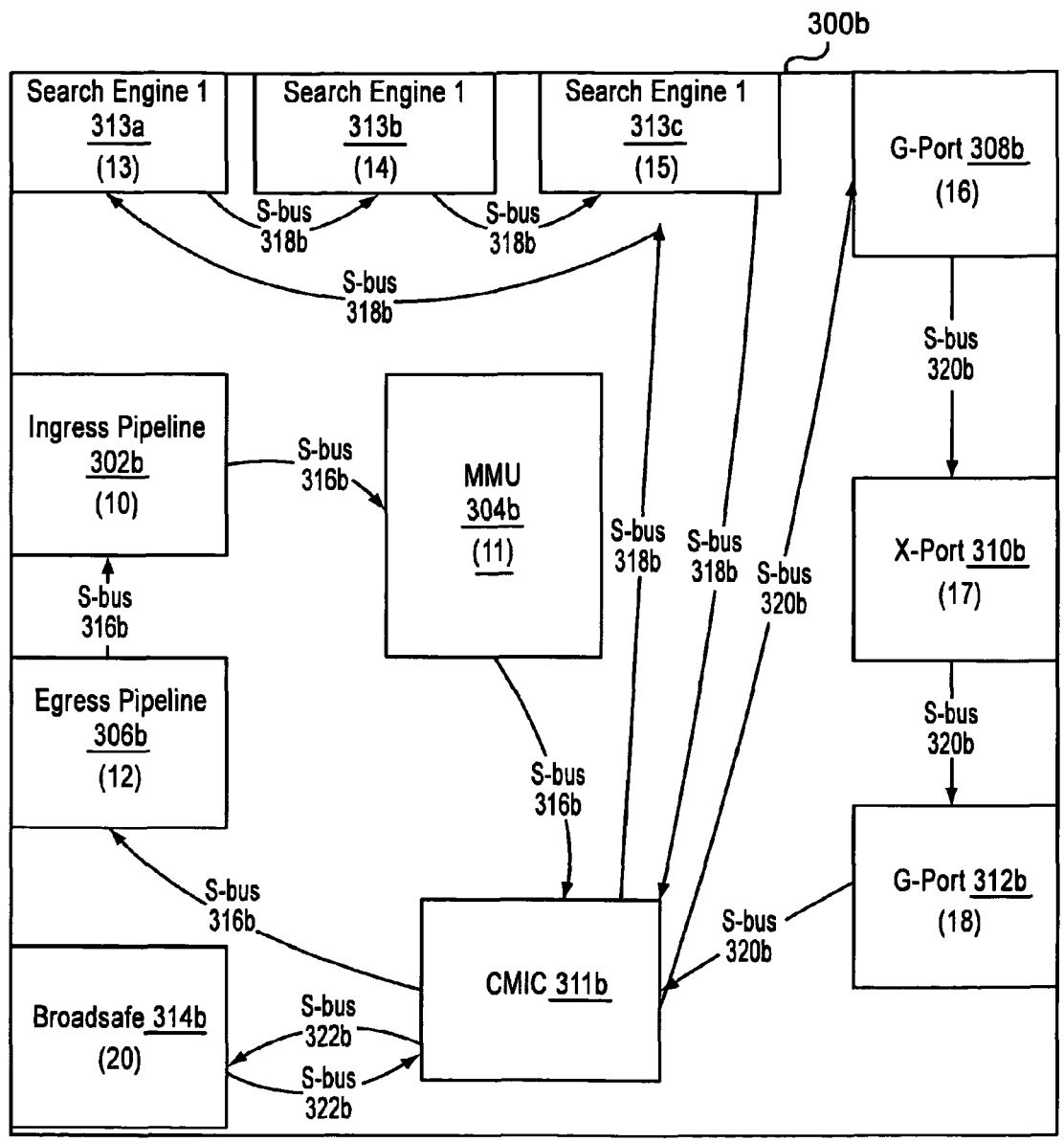

FIG. 3*b* illustrates another embodiment of a switching chip 300*b* that includes an ingress pipeline module 302*b* that is assigned a block identifier of 10, a MMU module 304*b* that is assigned a block ID of 11, an egress pipeline module 306*b* that is assigned a block ID of 12, GPORT and XPORT 308*b*-

312b, search engine 313a-313c, a broad safe module 314b and a CMIC™ module 311b. Switching chip 300b also includes four s-bus rings 316b-322b, wherein CMIC™ module 311b uses s-bus ring 316b to send information to and receive information from egress module 306b, ingress module 302b and MMU 304b, s-bus ring 318b to send information to and receive information from search engine 313a-313c, s-bus ring 330b to send information to and receive information from GPORT and XPORT 308b-312b, and s-bus ring 322b to send information to and receive information from broad safe module 314b. In both embodiments, shown in FIGS. 3a and 3b, CMIC™ module 311 operates as the s-bus master for each s-bus and the other devices on the s-busses are s-bus slaves. Thus, each of the s-busses is used to convey messages for which CMIC™ module 311 is the master and other s-bus modules are slaves. In an embodiment, CMIC™ module 311 is the only transaction initiator and all of the messages initiated by CMIC™ module 311 require an acknowledgement message which CMIC™ module 311 waits for from the s-bus slave before it sends the next s-bus message.

In the present invention, the order of the s-bus slave devices does not impact the protocol implemented by CMIC™ module 311a/311b. For example, the order of ingress module and egress module in chip 300b does not impact the protocol implemented by CMIC™ module 311b. In an embodiment, if a bus ring is unused, the inputs to CMIC™ module 311 must be tied to zeros and CMIC™ module 311 outputs can be left to float. If a ring has more than one s-bus slave on it, each slave agent on the s-bus should "pass through" messages not intended for it.

CMIC™ module 311a/311b includes a bus ring map register that allows associated software to configure the bus ring map register with the appropriate s-bus ring number for each s-bus valid block ID. For example, in chip 300a, bus ring 0 which includes s-bus 316a has the block ID 6 for ingress module 300a, bus ring 1 which includes s-bus 318a has the block ID 9 for MMU 304a, block IDs 1, 2 and 3 for GPORT and XPORT 308a-312a, bus ring 2 which includes s-bus 320a has the block ID 8 for egress module 306a and bus ring 3 which includes s-bus 322a has the block ID 4 for block safe module 314a. Similarly, in chip 300b, bus ring 0 which includes s-bus 316b has the block ID 10 for ingress module 300b, block ID 12 for egress module 306b, and block ID 11 for MMU 304b, bus ring 1 which includes s-bus 318b has the block IDs 13-15 for search engines 313a-313c, bus ring 2 which includes s-bus 320b has the block IDs 16-18 for GPORT and XPORT 308b-312b and bus ring 3 which includes s-bus 322b has the block ID 20 for block safe module 314b. The bus ring map register enables CMIC™ module 311 to send software initiated s-bus message on the appropriate s-bus ring by translating the s-bus block ID into a ring number.

CMIC™ module 311a/311b also includes a s-bus timeout register that allows the software to specify the maximum timeout value for any single s-bus transaction. This provides a common timeout mechanism for s-bus transactions on all rings.

In an embodiment of the invention, there are 28 ports, some of which are GPORTs and the others are XPORT. As such, CMIC™ module 311 needs to know how many total ports are on the chip, how many of those ports are GPORTs or XPORTs and how many registers are in each port, how many registers are in ingress module 302a and egress module 306a. According to the present invention, to determine the number of registers in the ingress and egress module, CMIC™ module 311 includes a configurable statistics register that stores the s-bus block ID for each of the ingress and egress modules, the number of statistics counters in each of the ingress and egress modules and the pipeline stage number in each of the ingress and egress modules where the statistics counters are located. To determine the number of registers in the MAC, CMIC™ module 311 stores in the configurable statistics register the total number of ports and indicates if a port is a GPORT or XPORT, the s-bus block ID for each port, the number of ports in each GPORT and the port number of each port in a GPORT, the number of statistics counters in each GPORT and XPORT, the pipeline stage number in each of the XPORT and GPORT where the statistics counters are located and the port number of the CPU port. Since CMIC™ module 311 is dynamically configurable based on the configurable statistics register, the design of the CMIC does not need to be changed if, for example, the number of ports is changed.

Thus, according to the present invention, when a network device is initialized, in the initialization routine, the CMIC™ module is also initialized. During initialization of the CMIC™ module, the associated software appropriately configures each register based on the number of ports and other variables associated with the initialized device. For example, each s-bus ring map register is initialized to indicate which slave devices are on each s-bus ring. Therefore, when a chip configuration, for example the device assigned to a s-bus ring, is changed, only the CMIC™ initialization routine needs to be modified.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

The foregoing description has been directed to specific embodiments of this invention. It will be apparent; however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A network device comprising:
   one or more busses;
   one or more network components, wherein each of the network components is coupled to at least one of the busses; and
   an interface controller comprising programmable registers, wherein the interface controller is coupled to the busses and is configured to:
      read a device identifier from one of the network components to determine a type of network component; and
      configure settings of the programmable registers based on the device identifier and the type of network component.

2. The network device of claim 1 wherein the interface controller is configurable for use in different network devices without hardware changes to the interface controller.

3. The network device of claim 1 wherein the interface controller is configurable to perform differently in different network devices without hardware changes to the interface controller.

4. The network device of claim 1 wherein the interface controller further comprises a register interface that is configured to couple the programmable registers to the busses and that is configured for use in different network devices without hardware changes to the register interface.

5. The network device of claim 1 wherein the interface controller is configured to read the device identifier and to configure the programmable registers based on the device identifier during an initialization routine of the network device.

6. The network device of claim 1 wherein the interface controller is further configured to perform an auto scan operation to link scan a status of the network components.

7. The network device of claim 6 wherein the interface controller further comprises a port bitmap to indicate a link status to be scanned.

8. An interface controller for use in different network devices, the interface controller comprising:
an interface that is configured to interface with one or more busses; and
one or more programmable registers that are coupled to the register interface and that are configured to use executable code to read a device identifier from a network component to determine a type of network component and to configure the programmable registers based on the device identifier and the type of network component.

9. The interface controller of claim 8 wherein the interface controller is configurable for use in different network devices without hardware changes to the interface and the programmable registers.

10. The interface controller of claim 8 wherein at least one of the programmable registers is configured to perform an auto scan operation to link scan a status of network components coupled to the busses.

11. The interface controller of claim 10 further comprising a port bitmap to indicate a link status to be scanned.

12. The interface controller of claim 8 wherein the interface is configured to interface with at least two busses that are internal to a network device, wherein each of the busses is coupled to at least one network component.

13. The interface controller of claim 8 wherein the programmable registers use the executable code to read the device identifier and to configure the programmable registers during an initialization routine of the network device.

14. The interface controller of claim 8 wherein at least one of the programmable registers is configured to select one of the busses on which to send a transaction to obtain status information for a network component coupled to the selected bus.

15. A method for using a same interface controller in different network devices, wherein the interface controller is coupled to one or more busses of a network device, the method comprising:
interfacing with the busses;
reading a device identifier from the network device;
determining a type of network device using the device identifier; and
configuring one or more programmable registers in the interface controller based on the device identifier and the type of network device.

16. The method as in claim 15 wherein configuring the programmable registers comprises configuring the programmable registers in the interface controller without hardware changes to the interface controller.

17. The method as in claim 15 wherein interfacing with the busses comprises interfacing with at least two busses that are internal to a network device, wherein each of the busses is coupled to at least one network component.

18. The method as in claim 15 wherein reading the device identifier and configuring the programmable registers is performed during an initialization routine of the network device.

19. The method as in claim 15 further comprising performing an auto scan operation to link scan a status of network components coupled to the busses.

20. The method as in claim 19 further comprising using a port bit map to indicate a link status to be scanned.

* * * * *

UNITED STATES PATENT AND TRADEMARK OFFICE
CERTIFICATE OF CORRECTION

PATENT NO.         : 8,244,922 B2
APPLICATION NO.    : 12/578150
DATED              : August 14, 2012
INVENTOR(S)        : Vamsi M. Tatapudi et al.

Page 1 of 1

It is certified that error appears in the above-identified patent and that said Letters Patent is hereby corrected as shown below:

On the Title Page:

Item (56), in "Primary Examiner", in column 2, line 1, Delete "Tammata" and insert -- Tammara --, therefor.

Signed and Sealed this
First Day of January, 2013

David J. Kappos
*Director of the United States Patent and Trademark Office*